(12) United States Patent
Epstein

(10) Patent No.: US 6,735,560 B1
(45) Date of Patent: May 11, 2004

(54) METHOD OF IDENTIFYING MEMBERS OF CLASSES IN A NATURAL LANGUAGE UNDERSTANDING SYSTEM

(75) Inventor: Mark E. Epstein, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 09/773,137

(22) Filed: Jan. 31, 2001

(51) Int. Cl.[7] .............................................. G06F 17/27
(52) U.S. Cl. ......................................................... 704/9
(58) Field of Search ................................ 715/533, 532, 715/505; 708/210; 707/6, 5, 3, 101, 27; 704/273; 341/95, 60, 51

(56) References Cited

U.S. PATENT DOCUMENTS

| | | | | |
|---|---|---|---|---|
| 5,056,021 A | * | 10/1991 | Ausborn | 704/9 |
| 5,774,588 A | * | 6/1998 | Li | 382/230 |
| 5,873,056 A | * | 2/1999 | Liddy et al. | 704/9 |
| 5,987,404 A | * | 11/1999 | Della Pietra et al. | 704/9 |

FOREIGN PATENT DOCUMENTS

WO  WO 9738376  * 10/1997  .......... G06F/17/30

OTHER PUBLICATIONS

Della Pietra et al., "Fertility Models for Statistical Natural Language Understanding," 1997, ACL, pp. 168–173.*
Epstein et al., "Statistical Natural Language Understanding Using Hidden Clumpings," May 1996, ICASSP, pp. 176–179.*
Wallis "Information Retrieval based on Paraphrase," Apr. 1993, PACLING, pp. 1–8.*

* cited by examiner

Primary Examiner—Richemond Dorvil
Assistant Examiner—V. Paul Harper
(74) Attorney, Agent, or Firm—Akerman Senterfitt

(57) ABSTRACT

A method of configuring classes in a natural language understanding (NLU) system. The method can include the steps of assigning a unique value to members of a class in the NLU system. The step of generating possible substrings from the members in the class also can be included. Additionally, for each generated substring having at least one term in common with one of the members in the class, the step of associating with the generated substring the unique value assigned to the member can be included.

26 Claims, 3 Drawing Sheets

METHOD OF IDENTIFYING MEMBERS OF CLASSES IN A NATURAL LANGUAGE UNDERSTANDING SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of natural language understanding, and more particularly, to a method for identifying members of classes in a conversational natural language understanding system.

2. Description of the Related Art

Natural language understanding (NLU) systems enable computers to understand and extract information from human written or spoken language. Such systems can function in a complimentary manner with a variety of other computer applications where there exists a need to understand human language. NLU systems can extract relevant information contained within text and then supply this information to another application program or system for purposes such as booking flight reservations, finding documents, or summarizing text.

Currently within the art, many NLU systems are implemented as directed dialog systems. Directed dialog NLU systems typically prompt or instruct a user as to the proper form of an immediate user response. For example, a directed dialog NLU system can instruct a user as follows "Say 1 for choice A, Say 2 for choice B". By instructing the user as to the proper format for an immediate user response, the NLU system can expect a particular formatted speech response as input.

In contrast to a directed dialog NLU system, a conversational NLU system does not give a user directed and immediate guidance as to the proper form and content of a user response. Rather than guiding a user through a series of menus, such systems allow a user to issue practically any command or request for information at any time. Accordingly, a conversational NLU system must be able to understand and process those user responses at any point within a given dialog.

Within a conversational NLU system, a component called a classer can be used to identify text words belonging to a particular class of words. Common examples of word classes can include, but are not limited to, dates, times, mutual funds, or airlines. For example, a travel reservation system would be required to understand user requests for airline information or particular user specified airlines. Thus, the NLU system can be designed to identify airline names within a received text input wherein each airline name can be a member of a class called AIRLINE. Similarly, a financial management application can manage financial accounts wherein any specific mutual fund recognizable by the system can be a member of a class called FUND. Some classes, such as times or dates, can be application independent. Such classes can be represented relatively easily using context free grammars.

Generally, a grammar is a formal specification of the structures allowable in a language where the rules can be denoted using Backus-Naur Form (BNF). For example, a sentence can be denoted as "S :=NP VP", where the well formed sentence "S" can consist of a noun phrase (NP) and a verb phrase (VP). Notably, phrases and groups of phrases can be referred to as non-terminals. Accordingly, "NP" and "VP" can be referred to as non-terminals. Also, each element of the rule further can be parsed to the terminal or word level. For example, "NP :=ART N" can be a parse of a noun phrase having an article (ART) and a noun (N), such as "a boy". A grammar comprised of a system of rules having a single symbol on the left-hand side is said to be a context-free grammar.

Other classes, for example FUND or AIRLINE, tend to be application dependent. Application dependent classes can be represented using lists of allowable phrases or grammars designed to accept substrings of the full list.

Users of conversational NLU systems often do not fully and completely specify the arguments upon which a specified request or command can operate. For example, if a user requests information pertaining to a particular mutual fund within the user's portfolio, the user may say "tell me the performance of XYZ Fund", wherein "XYZ Fund" is the argument of the user specified action. The actual fund name, however, may be the "XYZ Aggressive Small Cap Growth Fund". In that case, the lists of allowable phrases or grammars, for example a class, must contain an entry or member for "XYZ Fund" which informs the NLU system that the phrase unambiguously refers to the correct fund name "XYZ Aggressive Small Cap Growth Fund". Still, if the NLU system must distinguish between a variety of funds from the XYZ company, the phrase "XYZ Fund" is not informative. For example, XYZ company can offer 30 different funds, each having the terms "XYZ" and "Fund" within the fund name. As a result, lists or grammars which are capable of accepting substrings of full strings, oftentimes can yield an ambiguous result, wherein multiple possible matches can exist for a particular argument. Notably, in this example, "XYZ Fund" can correspond to some thirty possible members of the FUND class. Such lists or grammars are said to be ambiguous.

Grammatical ambiguities, however, must be resolved in a conversational NLU system. For example, the NLU system must recognize that the user specified argument "XYZ Fund" can relate to over 30 possible funds. Accordingly, the NLU system must query the user for additional information to resolve which XYZ fund was intended by the user. One disadvantage of using an ambiguous list or grammar can be that the first possible match within the list or grammar is typically returned as a possible match for the user specified argument of the text input. Thus, an ambiguous list or grammar can fail to return an exhaustive listing of members of a class which can be possible matches for the user specified argument. Moreover, typically there is no way of ensuring that the returned member is the most accurate match within the list or grammar.

One proposed solution has been to use search engines to determine the user intended argument. Still, the use of search engines can be problematic. Typically, a search engine can locate some possible arguments, but search engines tend to find the shortest possible matches for the received user input and can overlook longer possible matches. Another disadvantage of conventional solutions can be the ease with which bugs can be introduced into the system when new members are added to a class. For example, the addition of members to a class can require many new "rules" to be added to the system. The interoperability of the new rules with the old rules can be difficult to analyze. In particular, the introduction of new rules can introduce ambiguities into the NLU system. Additionally, because the new rules impact the existing rules and often require the existing rules to be updated or edited, the likelihood of introducing bugs into the NLU system increases as additional members are included within a class. This can make NLU systems difficult, not only to maintain, but also to update.

SUMMARY OF THE INVENTION

The invention disclosed herein concerns a method for identifying members of classes in a natural language understanding (NLU) system. Generally, the invention enables additional members to be added to a class with little or no concern over retraining a statistical model or introducing conflicts or ambiguities into grammar based rules. User utterances converted to text or other text inputs containing possible members belonging to a particular class can be identified though the member may have been inaccurately or incompletely specified. The method can be particularly useful with regard to conversational NLU systems where ambiguities must be resolved. A word spotting algorithm in combination with a lookup table type of data structure can be used to resolve ambiguities and also to simplify updating and maintenance of a class of members. Accordingly, fewer errors can be introduced into the NLU system because existing rules need not be constantly rewritten to accommodate new members. Rather, the NLU system can search for substrings of an identified possible member and determine a likely member match based upon an intersection or union of matched substrings.

In particular, the invention provides a method of resolving ambiguities within a grammar or list of acceptable phrases in an NLU system. The invention can be configured by assigning a unique value to members of a class in the NLU system. A list of possible substrings, referred to a substring entries, can be determined from the members of the class and included within a data structure. Each substring entry can be associated with the value corresponding to each member having at least one term in common with the substring entry. In operation, received text string inputs can be processed by an NLU system classer. The classer, either grammatically based or statistically based, can identify text strings which can be possible members, but have been inaccurately or incompletely specified. The NLU system can search the substring entries for variations of an identified possible user specified member. For each match, the NLU system can store one or more values. Subsequently, the NLU system can take an intersection or union of the values to determine one or more member matches. Notably, the method can be performed using a word spotting algorithm and a lookup table type of data structure.

One aspect of the invention can be a method of configuring classes in an NLU system including a series of steps. The steps can include assigning a unique value to members of a class in an NLU system and generating possible substrings from the members of the class. For each generated substring having at least one term in common with one of the members in the class, the step of associating with the generated substring the unique value assigned to the member can be included.

Another aspect of the invention can be a method of identifying members of classes in an NLU system. In that case, the method can include the step of (a) receiving a text string input and identifying a possible member of an NLU class within the text string input. The step of (b) matching a longest possible term substring of the possible member to a substring entry in a list of substrings generated from actual members within an NLU class can be included. Notably, each actual member can have a corresponding unique value. Additionally, step (b) can begin with a first term of the possible member. If a match is found in step (b), the step of (c) associating one or more values corresponding to the substring entry with the possible member wherein each value can correspond to one of the actual members of the class can be included. The additional step of repeating steps (b) and (c) for a next term in the possible member until no terms remain in the possible member can be included.

If a match is found in step (b), beginning with a term in the possible member to the right of a rightmost term of the matched substring of the possible member, the additional step of matching a longest possible substring of the possible member to a substring entry from the list can be included. If no match is found in step (b), beginning with a next term to the right in the possible member, the step of matching a longest possible substring of the possible member to a substring entry in the list can be included.

Another embodiment of the invention can include the additional steps of taking an intersection or a union of the values associated with the possible member and selecting at least one actual member corresponding to the intersection or union of the values. Also, the step of querying a user for additional information to resolve an ambiguity in the intersection or union of the values can be included.

Another aspect of the invention can be a machine readable storage, having stored thereon a computer program having a plurality of code sections executable by a machine for causing the machine to perform a series of steps for configuring classes in an NLU system. The steps can include assigning a unique value to members of a class in an NLU system and generating possible substrings from the members of the class. For each generated substring having at least one term in common with one of the members in the class, the step of associating with the generated substring the unique value assigned to the member can be included.

Another aspect of the invention can be a machine readable storage, having stored thereon a computer program having a plurality of code sections executable by a machine for causing the machine to perform a series of steps for identifying members of classes in an NLU system. In that case, the step of (a) receiving a text string input and identifying a possible member of an NLU class within the text string input can be included. The step of (b) matching a longest possible term substring of the possible member to a substring entry in a list of substrings generated from actual members within an NLU class can be included. Notably, each actual member can have a corresponding unique value. Additionally, step (b) can begin with a first term of the possible member. If a match is found in step (b), the step of (c) associating one or more values corresponding to the substring entry with the possible member wherein each value can correspond to one of the actual members of the class can be included. The additional step of repeating steps (b) and (c) for a next term in the possible member until no terms remain in the possible member can be included.

If a match is found in step (b), beginning with a term in the possible member to the right of a rightmost term of the matched substring of the possible member, the additional step of matching a longest possible substring of the possible member to a substring entry from the list can be included. If no match is found in step (b), beginning with a next term to the right in the possible member, the step of matching a longest possible substring of the possible member to a substring entry in the list can be included.

Another embodiment of the invention can include additional code sections for causing the machine to perform the steps of taking an intersection or a union of the values associated with the possible member and selecting at least one actual member corresponding to the intersection or union of the values. Also, the step of querying a user for additional information to resolve an ambiguity in the intersection or union of the values can be included.

BRIEF DESCRIPTION OF THE DRAWINGS

There are shown in the drawings embodiments of which are presently preferred, it being understood, however, that the invention is not so limited to the precise arrangements and instrumentalities shown, wherein.

DETAILED DESCRIPTION OF THE INVENTION

The invention disclosed herein concerns a method for identifying members of classes in a natural language understanding (NLU) system. In particular, the invention provides a method of resolving ambiguities within a grammar or list of acceptable phrases in an NLU system. The invention can be configured by assigning a unique value to each word or group of words belonging to a particular class. Such words or groups of words can be referred to as members of the class. A list of all possible substrings can be determined from the members of the class and included within a data structure, for example a lookup table containing members and corresponding possible substrings. For reference, the list of all possible substrings can be referred to as substring entries. Each substring entry can be associated with the value corresponding to each member having at least one term in common with the substring entry. The resulting data structure of substring entries can be used to match user utterances identified as containing possible members belonging to a particular class, but which have been inaccurately or incompletely specified. The method can be particularly useful with regard to conversational NLU systems. Notably, the method can utilize simplified word spotting algorithms and lookup table types of data structures to resolve ambiguities within complex lists or grammars.

In operation, received text string inputs can be processed by an NLU system classer. The classer can be grammatically based or statistically based to identify members belonging to a particular class. In the case of a grammatically based classer, the classer can utilize grammars to identify members or inaccurately or incompletely specified members within a received text string input. By contrast, a statistically based classer can utilize statistical methods known in the art such as word spotting algorithms, maximum entropy, or decision trees as determined by training an NLU system using a training corpus to build a statistical model.

Regardless of which type of classer is used, the NLU system can identify possible members within the text string input. The NLU system further can match the longest substrings of the possible member to the substring entries in the data structure. For every match, the unique values associated with the substring entry can be stored in memory. After the NLU system has completed processing of the possible member and matched the longest substrings of the possible member to the substring entries, the NLU system can use the intersection of the stored numeric values to indicate the actual member referred to by the identified possible member. If no cross section exists, then the NLU system can compute the union of the numeric values. Thus, the NLU system can break down an identified possible member into constituent phrases for comparison against a list of all possible substrings entries in the data structure. Each match can result in a numeric value. Consequently, after completion of the processing, an intersection or a union of the numeric values can yield a likely member to which the possible member refers.

Figure 1:
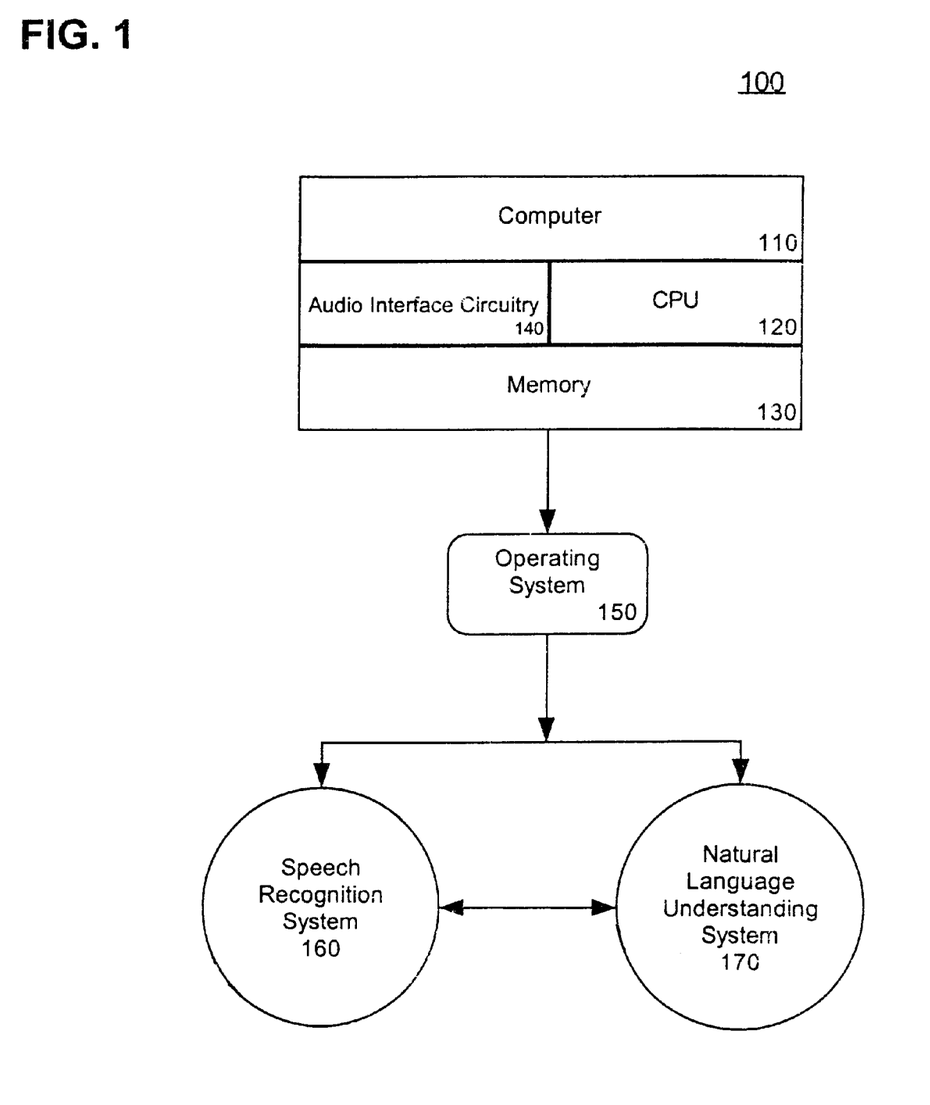
FIG. 1 is a schematic diagram illustrating an exemplary configuration and architecture capable of performing the method of the invention.

FIG. 1 is a schematic diagram illustrating a typical computer system 100 and exemplary architecture for use in conjunction with the present invention. The computer system is preferably comprised of a computer 110 including a central processing unit 120 (CPU), one or more memory devices 130 and associated circuitry. The CPU 120. can be comprised of any suitable microprocessor or other electronic processing unit, as is well known to those skilled in the art. The memory devices 130 can be comprised of an electronic random access memory and a bulk data storage medium. The system also can include suitable audio interface circuitry 140 for receiving an analog signal from a transducive device or for receiving digital audio via a network connection from another computer system. An optional user interface display unit such as a video data terminal (not shown) can be operatively connected to the computer system 100 through suitable interface circuitry. Speakers, as well as interface devices such as a mouse and keyboard, can be provided with the system, but are not necessary for operation of the invention as described herein. The various hardware requirements for the computer system as described herein can generally be satisfied by any one of many commercially available high speed computers.

As shown in FIG. 1, within the memory 130 of computer system 100 can be an operating system 150, a speech recognition system 160, and an NLU system 170. In FIG. 1, the speech recognition system 160 and NLU system 170 are shown as separate computer programs. It should be noted however that the invention is not limited in this regard, and these computer programs could be implemented as a single, more complex computer program. For example, the speech recognition system 160 and the NLU system 170 can be realized in a centralized fashion within the computer system 100. Alternatively, the aforementioned components can be realized in a distributed fashion where different elements are spread across several interconnected computer systems. In any case, the components can be realized in hardware, software, or a combination of hardware and software. Any kind of computer system, or other apparatus adapted for carrying out the methods described herein is suited. The system as disclosed herein can be implemented by a programmer, using commercially available development tools for the particular operating system used.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

In operation, a user can initiate a communications session with computer system 100 through a conventional communications link. More specifically, the communications link can be a data connection through a computer communications network, the Internet, or a voice connection via telephone. For example, with the latter instance, the user can contact computer system 100 by dialing a service telephone number and initiating voice communication with the telephone switching system 110. In response, system 100 can answer the user's telephone call.

Audio signals representative of sound can be received using a microphone or other transducive element such as a telephone. The audio signals can be processed within the computer system 100 using conventional computer audio circuitry so as to be made available to the operating system 150 in digitized form. For example, the audio signals can be received from a source located proximate to the computer system 100. Alternatively, audio signals can be received in analog or digital format from a source remote from the location of the computer system 100 via a computer communications network. The audio signals received by the computer system 100 are conventionally provided to the speech recognition system 160 via the computer operating system 150 in order to perform speech recognition functions. For example, the audio signals can be processed by the speech recognition system 160 to identify words spoken by a user into a transducive element. The resulting text from the speech recognition system 160 can be provided to the NLU system 170.

Notably, the NLU system 170 can receive text from a variety of sources and need not receive text from a speech recognition system. For example, the NLU system can receive a text input from a system wherein a user has typed information directly into the system. Regardless, upon receiving a text input, the NLU system 170 can process the received text using statistical processing, grammars, or both, each of which is known in the art, to extract meaning from the received text input.

Figure 2:
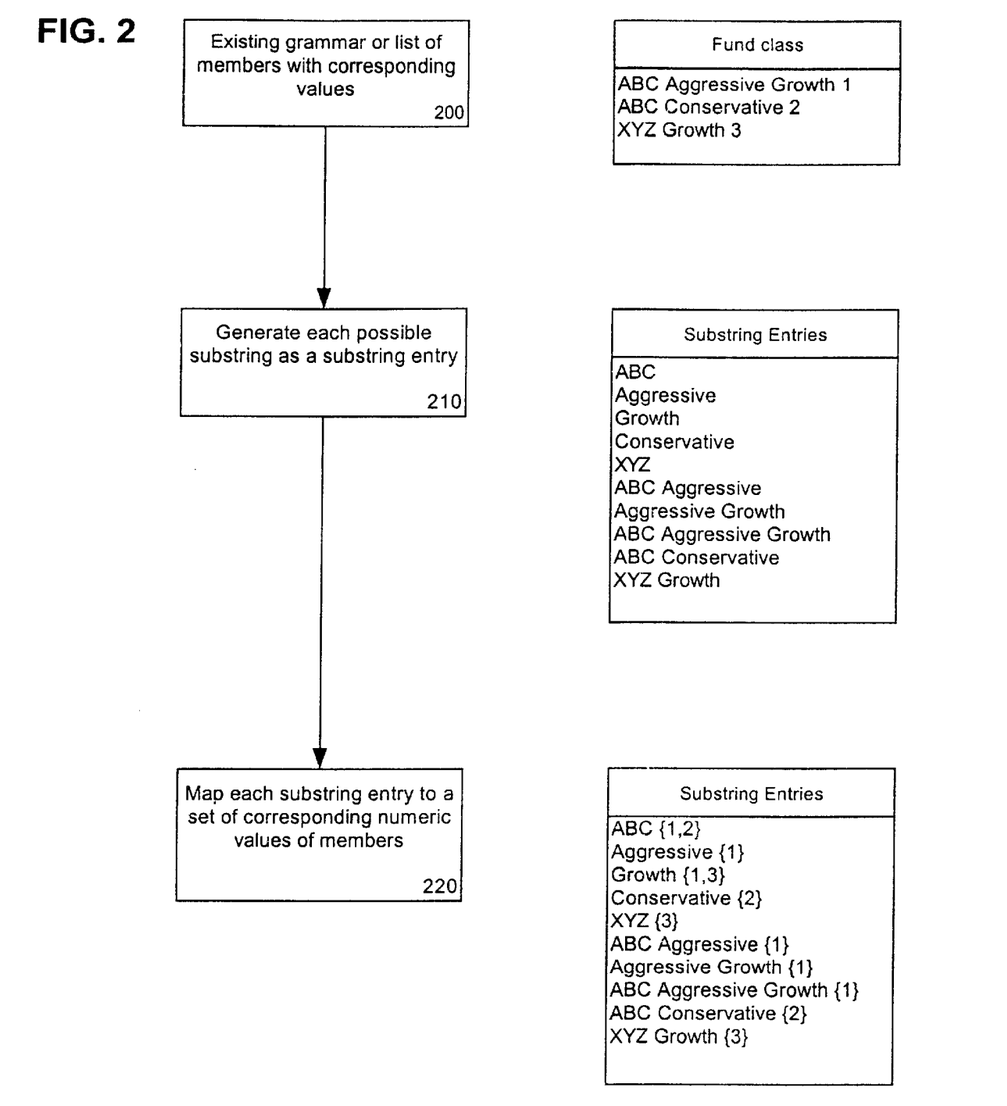
FIG. 2 is a flow chart illustrating an exemplary method of configuring a system for performing a method of the invention.

FIG. 2 is a flow chart illustrating an exemplary method of configuring classes in an NLU system as performed by the computer system 100 of FIG. 1. The method begins in step 200 with a listing of acceptable text phrases or terminal strings recognized by a grammar, both of which hereafter can be referred to as members of a class. Step 200 depicts an exemplary class, "FUND", which identifies therein three different members corresponding to mutual fund names. It should be appreciated that the class FUND is used herein as an example only. Accordingly, the invention should not be limited only to financial classes. Rather, the invention can be used suitably with any application specific class. Notably, each member within the class has been associated with a unique numeric value. For example, "ABC Aggressive Growth" can be assigned the value 1, "ABC Conservative Growth" can be assigned the value 2, and "XYZ Growth" can be assigned the value 3. It further should be appreciated that the members can be assigned to other values and the invention is not limited to numerical values. Rather any type of value can be used such that each member is assigned a unique value. After completion of step 200, the method can continue to step 210.

In step 210, possible substrings of the members of the class can be determined. As shown in step 210, 10 different substrings have been determined from the members comprising the class called FUND. Each combination of the terms comprising the members of the class, referred to as a substring entry, can be determined. Notably, the ordering of the individual terms comprising the member can be maintained. For example, the text phrase "ABC Aggressive Growth" can generate the following substrings: "ABC Aggressive Growth", "ABC Aggressive", "ABC", "Aggressive", "Growth", and "Aggressive Growth". Thus possible substrings can be derived from the members of the class without changing the order of the terms comprising each member. A similar process can be performed for each member of the class. Any redundancy can be eliminated. For example, though the term "ABC" exists within two members of the FUND class, the substring entry "ABC" need only be included within the substring entries one time. It should be appreciated that substring generation can be performed by an NLU system designer, and that the specific substrings generated can be application specific and a result of various design criteria and decisions. After completion of step 210, the method can continue to step 220.

In step 220, the unique numeric values corresponding to each member of the class can be associated with one or more of the substring entries. In particular, a substring entry can be associated with each unique value corresponding to an member having at least one term in common with the substring entry. For example, as shown in step 220, the substring entry "ABC" has been associated with the numeric values of 1 and 2 because "ABC" is common to both members "ABC Conservative" having a value of 2 and "ABC Aggressive Growth" having a value of 1. The term "Aggressive" has been associated with the numeric value of 1 because that substring entry is only found within the member "ABC Aggressive Growth" having a numeric value of 1. Thus, each substring entry can be associated with one or more numeric values which correspond to the members of the class having at least one term in common with the substring entry.

Figure 3:
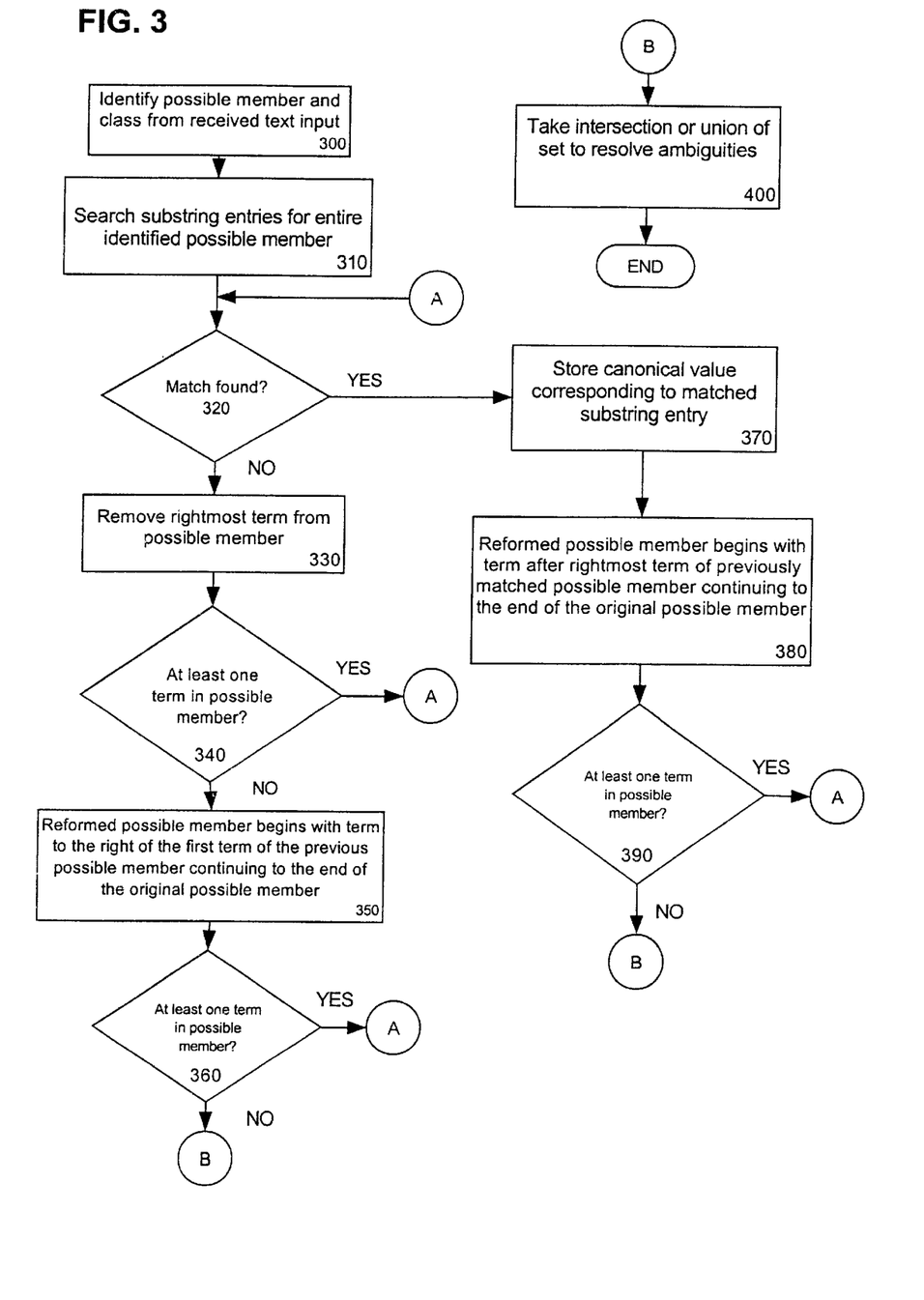
FIG. 3 is a flow chart illustrating an exemplary method of identifying members of classes in a natural language understanding system.

FIG. 3 is a flow chart illustrating an exemplary method of identifying members of classes in an NLU system as performed using the exemplary computer system 100 of FIG. 1. Beginning in step 300, a classer within the NLU system of FIG. 1 has recognized a possible member as belonging to a particular class. For example, in the case of an NLU system serving as an interface for a financial system, an exemplary received text input can be "what is the price of ABC Growth Fund today". The classer of the NLU system can determine that the text string "ABC Growth Fund" is a possible member corresponding to the class called FUND. The FUND class can contain the names of mutual funds, or members, which can be administered within the financial system having the NLU system as an interface. Notably, the text input can be provided by any of a variety of sources such as a speech recognition system which has converted a user spoken utterance to text or from a user directly typing text into a system which has provided the text to the NLU system for processing. After completion of step 300, the method can continue to step 310.

In step 310, the NLU system begins to search the substring entries for the entire identified possible member. Taking the previous example, the NLU system has identified the possible member "ABC Growth Fund" as a potential member of the FUND class. Thus, the NLU system can first search for the complete text string "ABC Growth Fund" within the substring entries. After completion of step 310, the method can proceed to step 320.

In step 320, the NLU system can determine whether a match exists within the substring entries for the identified possible member. For example, the NLU system can determine whether a match exists within the substring entries for the text string "ABC Growth Fund". If a match exists within the substring entries, the method can proceed to step 370. If not, the method can proceed to step 330.

In step 330, after determining that a match does not exist within the substring entries for the identified possible member, the identified possible member can be truncated by one term. In particular, the rightmost term of the text string can be removed thereby forming a new or reformed text string and possible member. Notably, the NLU system can retain the original identified possible member, as well as any permutations or truncations of the original possible member in memory. For example, the possible member "ABC Growth Fund" does not exist within the exemplary substring entries. Consequently, in step 330, the possible member can be truncated by one term. Specifically, the term "Fund" can be removed leaving the text string "ABC Growth" as a reformed possible member. After completion of step 330, the method can continue to step 340.

In step 340, the NLU system can determine whether the reformed possible member contains at least one term. If so, the text string has not been truncated to a length of zero terms and the method can continue to jump circle A so that the NLU system can search for the reformed possible member. Continuing with the example, in this case, the reformed possible member "ABC Growth" contains two terms. Thus, the method can continue to jump circle A and proceed to step 320 to search the substring entries for "ABC Growth". If, however, the text string has been truncated to zero terms, the method can proceed to step 350.

In step 350, the NLU system forms a new possible member by starting with the next term to the right of the first term of the previous text string. In particular, the NLU system can determine that no match exists within the substring entries for any of the possible member variants formed by truncating the rightmost term. Notably, because each of the variants of the possible members formed thus far were formed by truncating the rightmost term, each began with the same first term. For example, if the previous possible member was "ABC Growth Fund", the NLU system can begin with the term "Growth" and use the remaining portion of the original member as the new possible member. Thus, the resulting possible member can be "Growth Fund". After completing step 350, the method can continue to step 360.

In step 360, the NLU system again can determine whether the reformed possible member contains at least one term. If so, the method can proceed to jump circle A so that the NLU system can search the substring entries for the existence of the reformed possible member. Continuing with the previous example, the NLU system can search for "Growth Fund". If no terms remain within the text string, however, the method can proceed to jump circle B. In that case, the original possible member identified in step 300 has been exhausted and no further terms remain to be searched within the substring entries.

Regarding step 320, if the NLU system had truncated the text string "ABC Growth Fund" to form the resulting possible member "ABC Growth", the system again can determine that no match exists within the substring entries. Upon a subsequent iteration, the resulting truncated and reformed possible member can be "ABC" wherein the term "Growth" has been truncated. In the case where the substring entries contain a match for the reformed possible member, the method can continue to step 370. Specifically, after truncating the term "Growth", in step 320 the NLU system can determine that a match exists for the substring "ABC" within the substring entries. Thus, in step 370, the NLU system can store the numeric value corresponding to the substring entry "ABC". In this case, for example, the NLU system can store the numeric values 1 and 2. After completion of step 370, the method can proceed to step 380.

In step 380, the NLU system again can reform the possible member. Specifically, the NLU system can reform the new possible member to begin with the term to the right of the last term of the possible member just matched in step 320, and continue to the end of the original possible member. For example, if the NLU system matched the text string "ABC", in step 380, the NLU system can form a new possible member with the term to the right of the term "ABC". Recalling the original possible member "ABC Growth Fund", the newly formed possible member can be "Growth Fund". After completion of step 380, the system can continue to step 390.

In step 390, the NLU system can determine whether at least one term is left within the reformed possible member. If so, the method can proceed to jump circle A to continue searching. If not, the method can proceed to jump circle B.

For example, the reformed possible member "Growth Fund" contains at least one term. Thus, the NLU system can determine whether a match exists for "Growth Fund". Notably, "Growth Fund" does not exist within the exemplary substring entries. Accordingly, the method can proceed to step 330 where the rightmost term "Fund" can be truncated leaving the reformed possible member "Growth". The method can continue to step 320, where the NLU system can determine that a match for "Growth" exists within the substring entries. Continuing to step 370, the NLU system can store the numeric values of 1 and 3 corresponding to the substring entry "Growth" in a location in memory corresponding to the original possible member "ABC Growth Fund".

Continuing with the example, the NLU system again can reform the possible member in step 380. In this case, the new possible member can be "Fund" wherein the NLU system has reformed the new possible member beginning with the term to the right of the matched term of the previous possible member "Growth". As the method proceeds and no match is determined for the possible member "Fund" in step 320, the possible member again is truncated in step 330. After truncating the text phrase, no terms remain. Therefore, the NLU system can proceed through steps 350 and 360. Again, because no further terms remain, execution of step 360 results in proceeding to jump circle B to step 400.

In step 400, the intersection of any numeric values stored as a result of a match can be determined. If no intersection exists, the NLU system can determine the union of numeric values. For example, searches for variants of the original possible member "ABC Growth Fund" resulted in two sets of numeric values. Notably, the substring "ABC" resulted in the numeric values of 1 and 2, while the substring "Growth" resulted in the numeric values of 1 and 3. Thus, the union intersection of numeric values is 1, while the union is 1, 2, and 3. Taking the union, the NLU system can then determine that although the user requested a non-existent fund name, "ABC Growth Fund" in this case, the user intended to refer to the fund name "ABC Aggressive Growth".

In cases where the union or intersection of values results in more than one numeric value, the NLU system can query the user for further information, or alternatively, return each member name corresponding to the resulting numeric values as a possible selection. For example, if the union or intersection of stored numeric values was 1 and 2, the NLU system can return the members "ABC Aggressive Growth" and "ABC Conservative" as possible selections.

What is claimed is:

1. A method of configuring classes in a natural language understanding (NLU) system, said method comprising the steps of:
   assigning a unique value to members of a class in said NLU system;
   generating possible substrings from said members in said class to determine a supervised set of allowable strings; and
   for each generated substring having at least one term in common with one of said members in said class, associating with said generated substring said unique value assigned to said member.

2. A method of identifying members of classes in a natural language understanding (NLU) system, said method comprising the steps of:
   (a) receiving a text string input and identifying a possible member of an NLU class within said text string input;
   (b) matching a longest possible term substring of said possible member to a substring entry in a list of substrings generated from actual members within an NLU class, each said actual member having a corresponding unique value; and
   (c) if a match is found in said step (b), associating one or more values corresponding to said substring entry with said possible member, each said value corresponding to one of said actual members of said class.

3. The method of claim 2, further comprising the step of:
   (d) repeating said steps (b) and (c) for a next term in said possible member until no terms remain in said possible member.

4. The method of claim 2, further comprising the step of:
   if no match is found in said step (b), beginning with a next term to the right in said possible member, matching a longest possible substring of said possible member to a substring entry in said list.

5. The method of claim 2, further comprising the step of:
   if a match is found in said step (b), beginning with a term in said possible member to the right of a rightmost term of said matched substring of said possible member, matching a longest possible substring of said possible member to a substring entry from said list.

6. The method of claim 2, wherein said step (b) begins with a first term of said possible member.

7. The method of claim 2, further comprising the step of:
   taking an intersection of said values associated with said possible member.

8. The method of claim 7, further comprising the step of:
   selecting at least one actual member corresponding to said intersection of said values, wherein each value of said intersection of values indicates an actual class member that is a candidate for said possible member of the NLU class specified in said text string.

9. The method of claim 7, further comprising the step of:
   querying a user for additional information to resolve an ambiguity in said intersection of said values.

10. The method of claim 2, further comprising the step of:
    taking a union of said values associated with said possible member.

11. The method of claim 10, further comprising the step of:
    selecting at least one actual member corresponding to said union of said values, wherein each value of said union of values indicates an actual class member that is a candidate for said possible member of the NLU class specified in said text string.

12. The method of claim 10, further comprising the step of:
    querying a user for additional information to resolve an ambiguity in said union of said values.

13. The method of claim 2, wherein a word spotting algorithm and a lookup table data structure are used.

14. A machine readable storage, having stored thereon a computer program having a plurality of code sections executable by a machine for causing the machine to perform the steps of:
    assigning a unique value to members of a class in said NLU system;
    generating possible substrings from said members in said class to determine a supervised set of allowable strings; and
    for each generated substring having at least one term in common with one of said members in said class, associating with said generated substring said unique value assigned to said member.

15. A machine readable storage, having stored thereon a computer program having a plurality of code sections executable by a machine for causing the machine to perform the steps of:
    (a) receiving a text string input and identifying a possible member of an NLU class within said text string input;
    (b) matching a longest possible term substring of said possible member to a substring entry in a list of substrings generated from actual members within an NLU class, each said actual member having a corresponding unique value; and
    (c) if a match is found in said step (b), associating one or more values corresponding to said substring entry with said possible member, each said value corresponding to one of said actual members of said class.

16. The machine readable storage of claim 15, further comprising the step of:
    (d) repeating said steps (b) and (c) for a next term in said possible member until no terms remain in said possible member.

17. The machine readable storage of claim 15, further comprising the step of:
    if no match is found in said step (b), beginning with a next term to the right in said possible member, matching a longest possible substring of said possible member to a substring entry in said list.

18. The machine readable storage of claim 15, further comprising the step of:
    if a match is found in said step (b), beginning with a term in said possible member to the right of a rightmost term of said matched substring of said possible member, matching a longest possible substring of said possible member to a substring entry from said list.

19. The machine readable storage of claim 15, wherein said step (b) begins with a first term of said possible member.

20. The machine readable storage of claim 15, further comprising the step of:
    taking an intersection of said values associated with said possible member.

21. The machine readable storage of claim 20, further comprising the step of:
    selecting at least one actual member corresponding to said intersection of said values, wherein each value of said intersection of values indicates an actual class member that is a candidate for said possible member of the NLU class specified in said text string.

22. The machine readable storage of claim 20, further comprising the step of:

querying a user for additional information to resolve an ambiguity in said intersection of said values.

23. The machine readable storage of claim 15, further comprising the step of:

taking a union of said values associated with said possible member.

24. The machine readable storage of claim 23, further comprising the step of:

selecting at least one actual member corresponding to said union of said values, wherein each value of said union of values indicates an actual class member that is a candidate for said possible member of the NLU class specified in said text string.

25. The machine readable storage of claim 23, further comprising the step of:

querying a user for additional information to resolve an ambiguity in said union of said values.

26. The machine readable storage of claim 15, wherein a word spotting algorithm and a lookup table data structure are used.

* * * * *